(12) United States Patent
Chen et al.

(10) Patent No.: US 7,036,783 B2
(45) Date of Patent: May 2, 2006

(54) DRIVE BRACKET WITH LOCKING DEVICE

(75) Inventors: Yun Lung Chen, Tu-chen (TW); Da Long Sun, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/901,617

(22) Filed: Jul. 28, 2004

(65) Prior Publication Data

US 2005/0040306 A1 Feb. 24, 2005

(30) Foreign Application Priority Data

Aug. 22, 2003 (TW) .............................. 92215279 U

(51) Int. Cl.
*A47H 1/10* (2006.01)
(52) U.S. Cl. .............................. 248/298.1; 248/222.11; 361/685
(58) Field of Classification Search ................ 248/694; 361/684, 685, 726, 727; 312/223.2
See application file for complete search history.

(56) References Cited

U.S. PATENT DOCUMENTS

| | | | | |
|---|---|---|---|---|
| 3,686,896 A | * | 8/1972 | Rutter ........................ | 464/52 |
| 4,688,131 A | * | 8/1987 | Noda et al. ................. | 360/137 |
| 5,682,291 A | * | 10/1997 | Jeffries et al. .............. | 361/685 |
| 6,227,516 B1 | * | 5/2001 | Webster et al. ............. | 248/694 |
| 6,299,266 B1 | * | 10/2001 | Justice et al. ............... | 312/223.2 |
| 6,543,866 B1 | * | 4/2003 | Chen et al. ................. | 312/223.2 |
| 6,654,240 B1 | * | 11/2003 | Tseng et al. ................ | 361/685 |
| 6,728,109 B1 | * | 4/2004 | Wu ............................. | 361/747 |
| 6,853,549 B1 | * | 2/2005 | Xu ............................. | 361/685 |
| 2002/0172014 A1 | * | 11/2002 | Lung .......................... | 361/725 |
| 2004/0075978 A1 | * | 4/2004 | Chen et al. ................. | 361/685 |
| 2004/0105229 A1 | * | 6/2004 | Wang et al. ................ | 361/685 |

FOREIGN PATENT DOCUMENTS

| | | |
|---|---|---|
| TW | 81207129 | 9/1992 |
| TW | 82202124 | 8/1993 |
| TW | 82207667 | 6/1994 |

* cited by examiner

*Primary Examiner*—Robert P. Olszewski
*Assistant Examiner*—Timothy S. Smith
(74) *Attorney, Agent, or Firm*—Wei Te Chung

(57) ABSTRACT

A drive bracket (10) includes a locking device (30) to secure data storage devices (50) therein. The drive bracket has a bottom plate (11), and first and second side plates (12, 13). A plurality of slots (16) is defined in the side plates. The locking device is attached to the first side plate, and defines openings (31) corresponding to the slots. Two connecting arms (33) extend from the locking device in each opening. A handle (34) extends forwardly and outwardly from the connecting arms. A fastening portion (35) extends rearward and inwardly from the handle between junctions of the handle and the connecting arms. Pins (54) of each data storage device slide in the slots, with one leading pin riding over the fastening portion, and restrained by an end of the fastening portion. When the handle is pushed, the fastening portion is moved outwardly, and disengaged from the leading pin.

20 Claims, 7 Drawing Sheets

DRIVE BRACKET WITH LOCKING DEVICE

BACKGROUND OF THE INVENTION

1. Field of the Invention

The present invention relates to drive brackets, and particularly to a drive bracket having a locking device which readily secures data storage devices in the drive bracket and allows convenient removal of the data storage devices therefrom.

2. Description of the Related Art

Generally speaking, when a computer is assembled, a drive bracket is mounted in a computer enclosure, and then data storage devices are fixed to the drive bracket. The data storage devices comprise various combinations of hard disk drives (HDDs), floppy disk drives (FDDs), and compact disk-read only memory (CD-ROM) drives.

A conventional data storage device is generally attached to a drive bracket by bolts or rails. Examples are disclosed in Taiwan Patent Application Nos. 82202124, 81207129 and 82207667. Fixing a data storage device to a drive bracket with bolts is unduly laborious and time-consuming. Furthermore, the computer enclosure needs extra operating space for carrying out the fixing operation. Fixing a data storage device in a drive bracket using rails is more convenient than using the above-described bolts. However, certain bolts are still needed to fix the rails to the drive bracket. Additionally, mounting systems using rails require a clearance between the data storage device and the drive bracket. This may cause electromagnetic interference (EMI) problems, and may lead to accumulation of static charges on the computer enclosure. Furthermore, the rails are generally made of plastic. This not only restricts grounding connection options between the data storage device and the drive bracket, but also tends to lead to extra maintenance because of the plastic rails easily wearing out and needing replacement.

Thus an improved drive bracket which overcomes the above-mentioned problems is desired.

BRIEF SUMMARY OF THE INVENTION

Accordingly, an object of the present of invention is to provide a drive bracket which readily and conveniently attaches data storage devices to a computer enclosure and which allows ready detachment therefrom.

To achieve the above-mentioned object, a drive bracket of a preferred embodiment of the present invention comprises a locking device to secure two data storage devices therein. The drive bracket has a bottom plate, and first and second side plates. A plurality of slots is defined in the side plates. The locking device is attached to the first side plate, and defines openings corresponding to the slots. Two connecting arms extend from a rear portion of the locking device in each opening. A handle extends forwardly and outwardly from the connecting arms. A fastening portion extends rearward and inwardly from junctions of the handle and the connecting arms. Pins of each data storage device slide in the slots, with one leading pin riding over the fastening portion and then being restrained by an end of the fastening portion. When the handle is pushed, the fastening portion is moved outwardly and disengaged from the leading pin.

Other objects, advantages and novel features of the present invention will be drawn from the following detailed description of the preferred embodiments of the present invention with the attached drawings, in which:

DETAILED DESCRIPTION OF THE INVENTION

Figure 1:
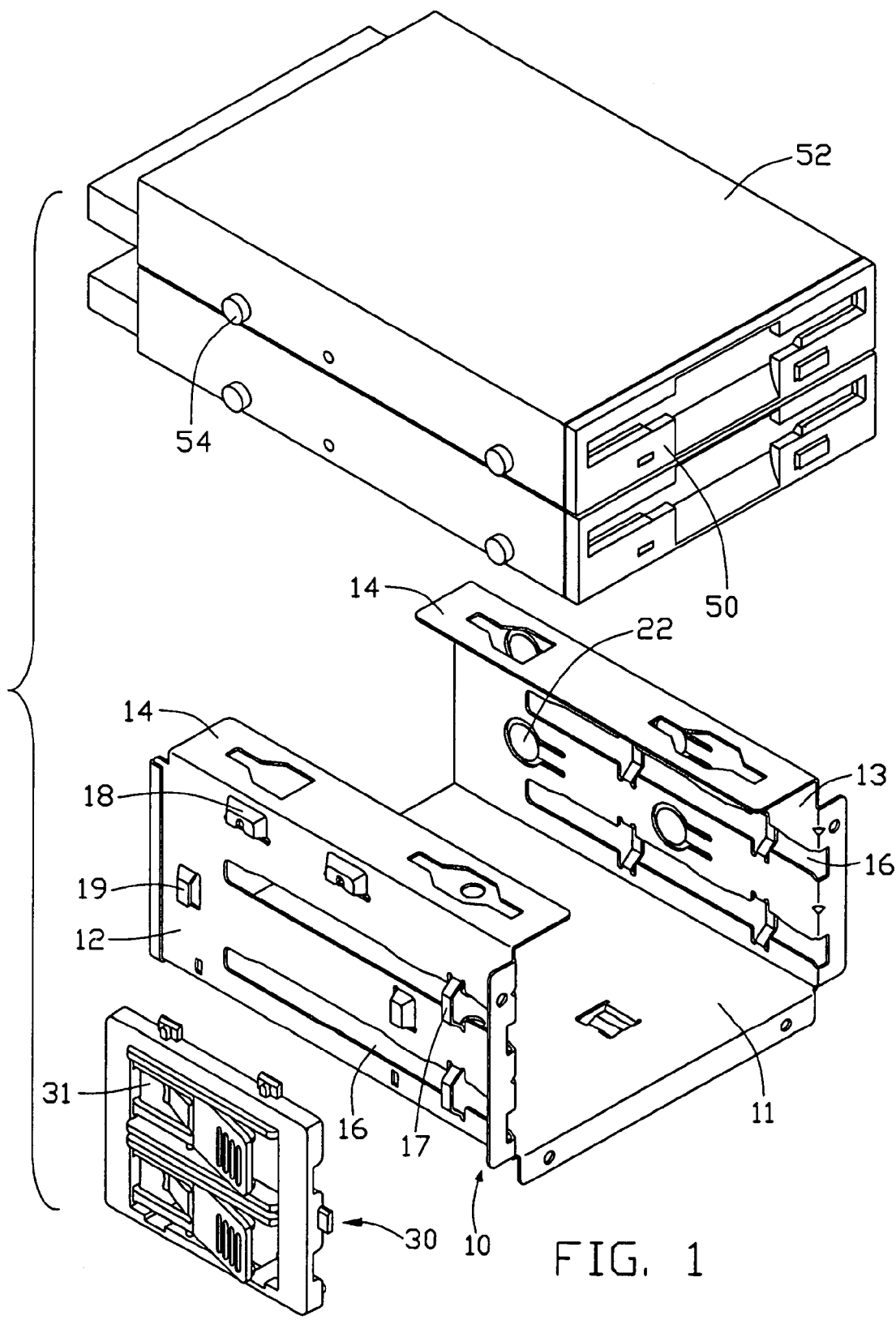
FIG. 1 is an exploded, isometric view of a drive bracket with a locking device in accordance with the preferred embodiment of the present invention, together with two data storage devices.
Figure 2:
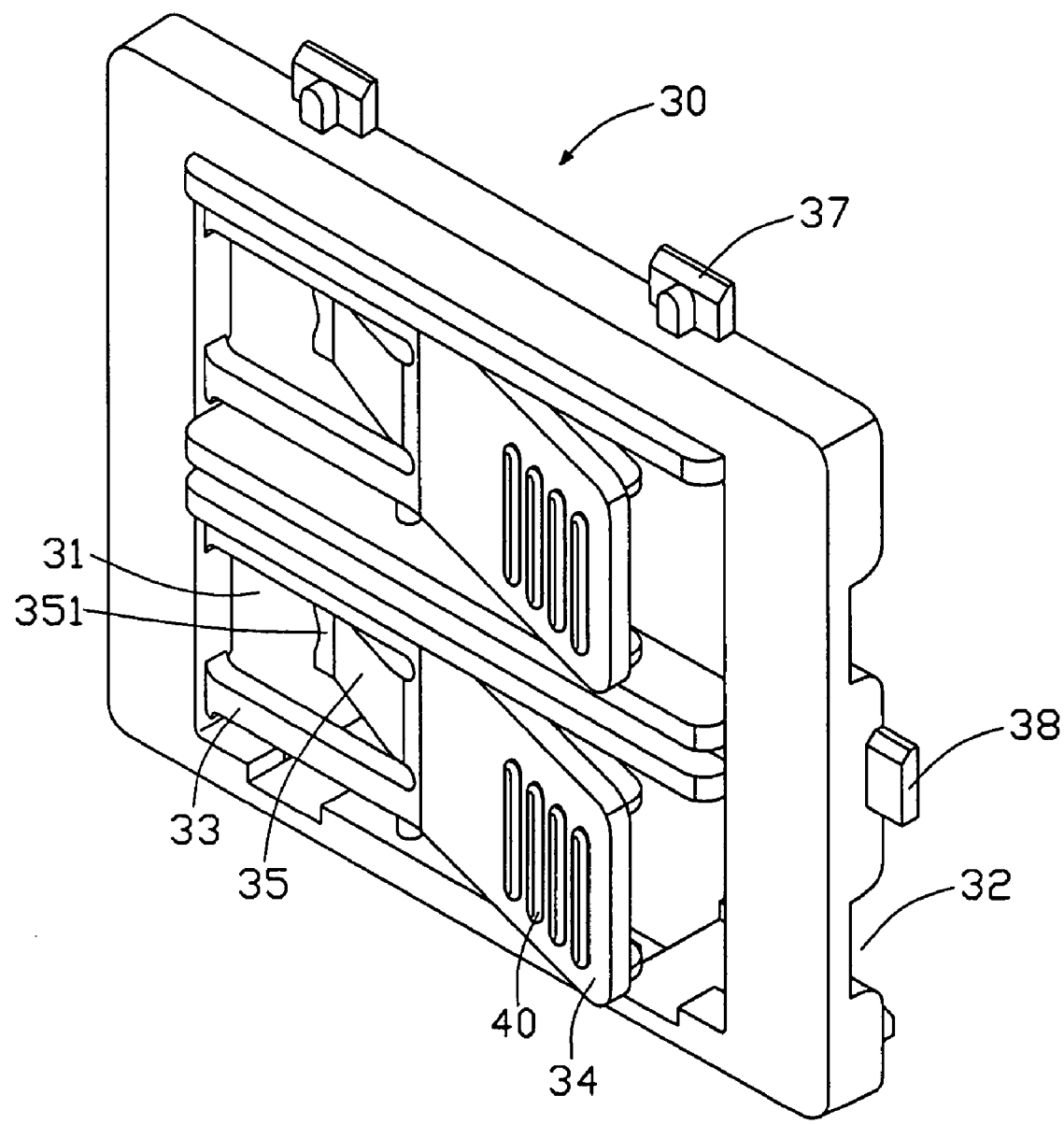
FIG. 2 is an enlarged view of the locking device of FIG. 1.
Figure 3:
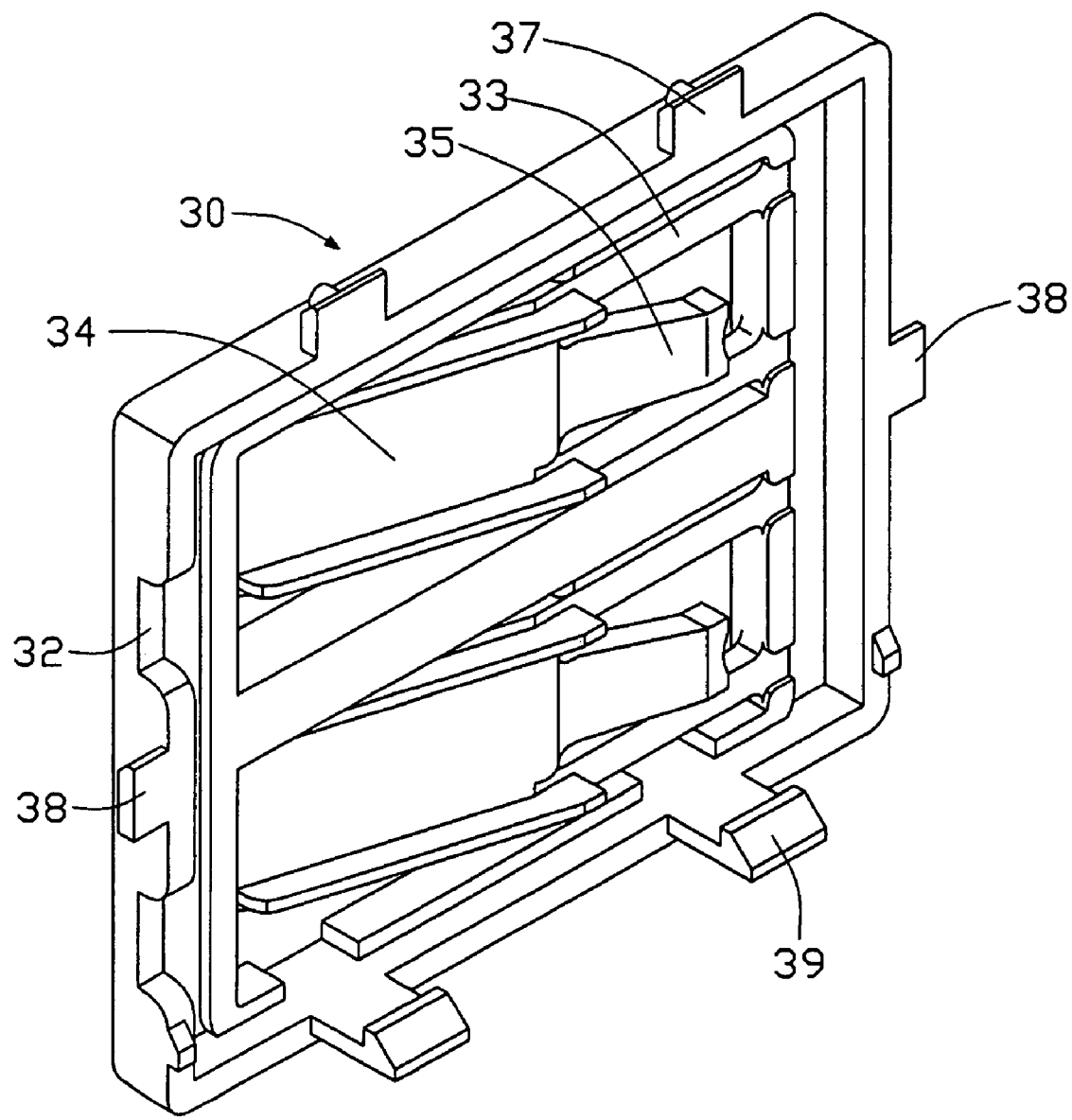
FIG. 3 is similar to FIG. 2, but viewed from another aspect.
Figure 4:
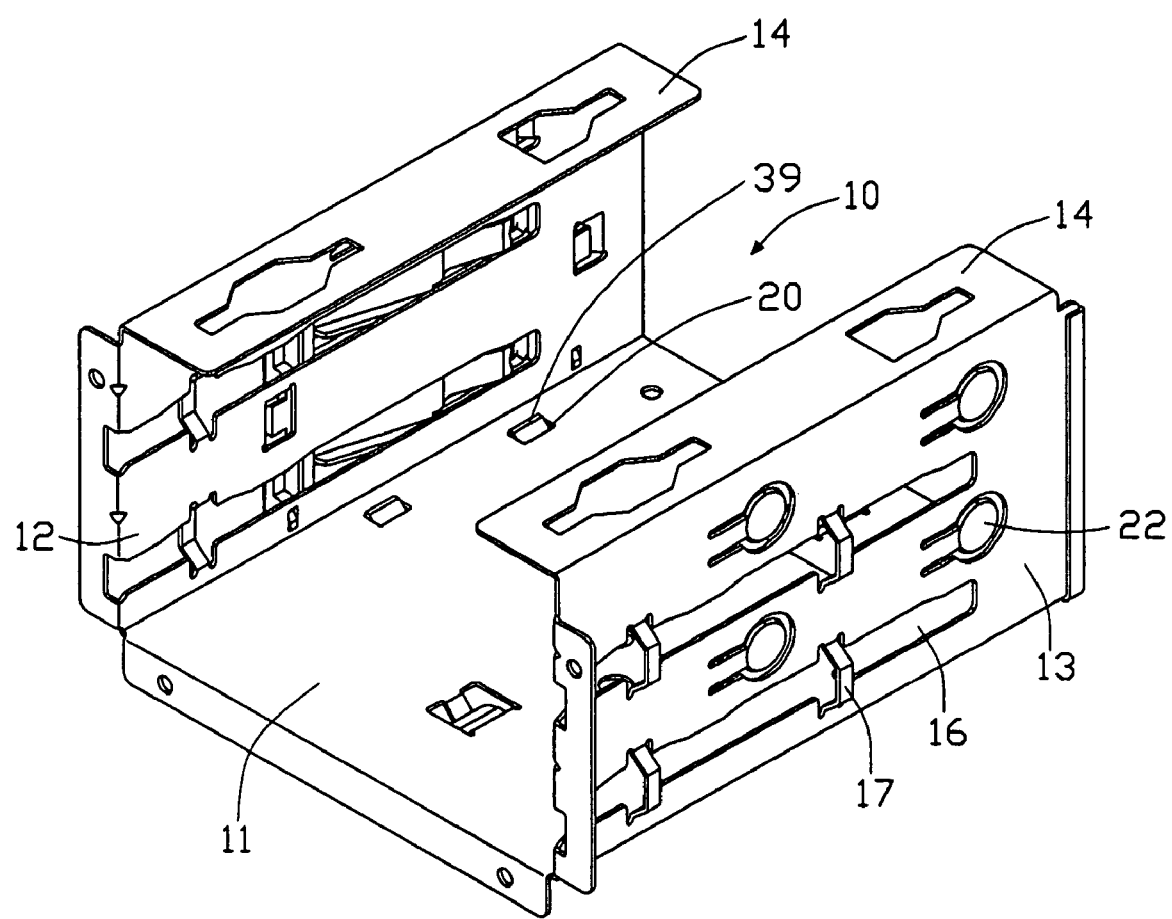
FIG. 4 is an isometric view of the drive bracket of FIG. 1, but viewed from another aspect.

Referring to FIGS. 1–4, a drive bracket 10 in accordance with the preferred embodiment of the present invention is used to accommodate two data storage devices 50 therein. A locking device 30 is used to secure the data storage devices 50 in the drive bracket 10. Each data storage device 50 is accommodated in a respective case 52. A pair of pins 54 is formed on one side of the case 52.

The drive bracket 10 comprises a bottom plate 11, and a first side plate 12 and a second side plate 13 extending upwardly from opposite edges of the bottom plate 11 respectively. Two flanges 14 extend toward each other from top ends of the first and second side plates 12, 13 respectively. Two pairs of long slots 16 are symmetrically defined in the first and second side plates 12, 13, with one pair of the slots 16 being above the other pair of the slots 16. A width of each slot 16 is slightly greater than a diameter of each pin 54 of either data storage device 50. A plurality of reinforcing strips 17 is vertically formed across the slots 16. Two positioning portions 18 are stamped outwardly from the first side plate 12 near the flange 14. Two retaining portions 19 are stamped outwardly from the first side plate 12 generally between the slots 16. Two locking holes 20 are defined in the bottom plate 11 of the drive bracket 10 near the first side plate 12. A plurality of resilient fingers is formed in the second side plate 13 by stamping. Each resilient finger has a dome-shaped tab 22 at a distal end thereof, the tab 22 protruding inwardly from an inside face of the first side plate 12.

The locking device 30 is integrally formed, and defines two openings 31 therein corresponding to the slots 16 of the first side plate 12 of the drive bracket 10. Two guiding entries 32 are defined in a front portion of the locking device 30, in alignment with the openings 31 respectively. Two straight connecting arms 33 extend from a rear portion of the locking device 30 into each opening 31. A handle 34 extends slantingly forwardly and outwardly from distal ends of the two connecting arms 33. A fastening portion 35 extends slantingly rearward and inwardly from the handle 34 between junctions of the handle 34 and the connecting arms 33. The handle 34 and the fastening portion 35 are substantially coplanar. A pair of supporting portions (not labeled) respectively interconnects the distal ends of the connecting arms 33 with a main body (not labeled) of the locking device 30 at upper and lower extremities respectively of the opening 31. The supporting portions cooperate to provide a pivot axis. The handle 34 is pivotable about said pivot axis, and the fastening portion 35 is thus drivably pivotable about said pivot axis. A plurality of ridges 40 is formed on the handle 34, for facilitating manual gripping thereof. A bent tab 351 with a concave end is formed from a distal end of the fastening portion 35. Two positioning tabs 37 are formed upwardly from a top side of the locking device 30, corresponding the positioning portions 18 of the drive bracket 10. Two retaining tabs 38 are respectively formed from front and rear sides of the locking device 30, corresponding to the retaining portions 19 of the drive bracket 10. Two hooks 39 extend inwardly from a bottom side of the locking device 30, corresponding to the locking holes 20 of the drive bracket 10.

Figure 5:
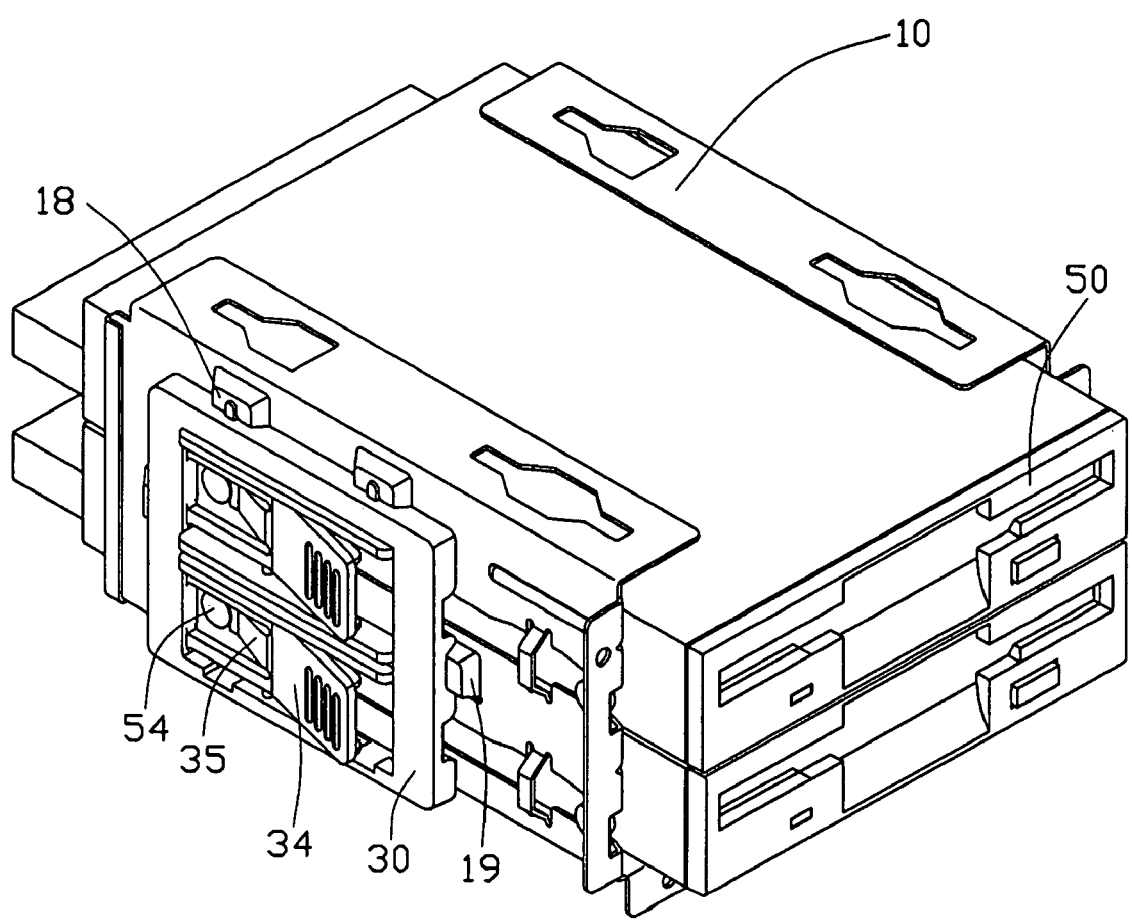
FIG. 5 is an assembled view of FIG. 1.
Figure 6:
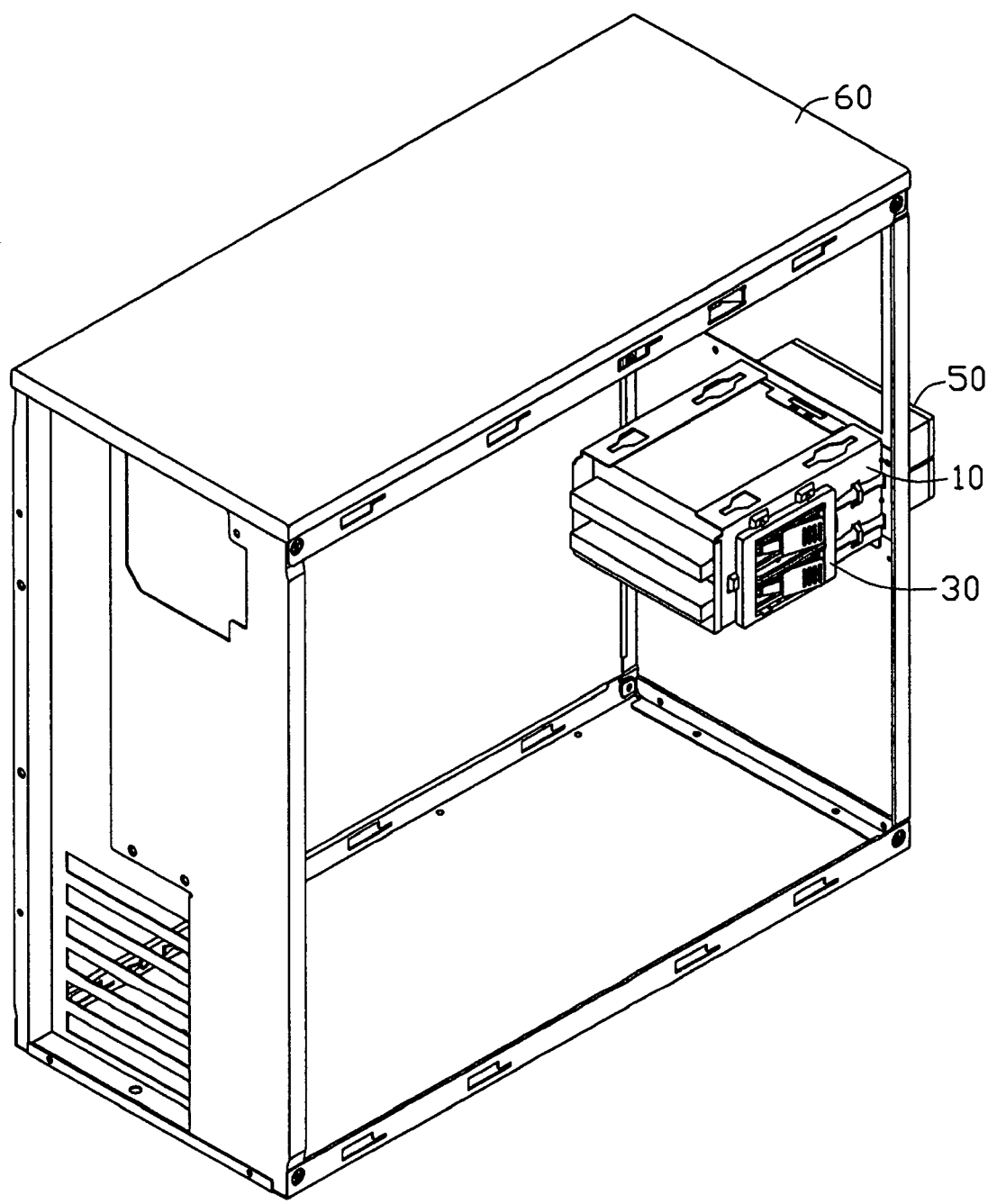
FIG. 6 is an isometric view showing the assembly of FIG. 5 attached to a computer enclosure.

Referring also to FIGS. 5 and 6, in assembly, the locking device 30 is attached onto the first side plate 12 of the drive bracket 10. The positioning tabs 37 engage in the positioning portions 18, the retaining tabs 38 engage in the retaining portions 19, and the hooks 39 engage in the locking holes 20. The fastening portions 35 of the locking device 30 extend into the corresponding slots 16 of the drive bracket 10. The drive bracket 10 with the locking device 30 is then mounted to a computer enclosure 60.

The pins 54 of the cases 52 are slid into the corresponding slots 16 of the drive bracket 10 via the guiding entries 32. The two leading pins 54 ride over and resiliently deform the fastening portions 35 and the bent tabs 351 of the locking device 30. When the leading pins 54 pass beyond the bent tabs 351, the fastening portions 35 rebound and resiliently press the cases 52 toward the second side plate 13. The resilient tabs 22 of the second side plate 13 are resiliently deformed toward an outside of the second side plate 13, and press the cases 52 toward the first side plate 12. The leading pins 54 abut against the concave ends of the bent tabs 351, and are thus prevented from moving out from the drive bracket 10. The data storage devices 50 are thus securely attached to the drive bracket 10.

In disassembly, the handles 34 are depressed, and drive the fastening portions 35 to pivot slightly outwardly. The bent tabs 351 of the fastening portions 35 are thus disengaged from the leading pins 54. The data storage devices 50 are then easily slid out from the drive bracket 10.

In an alternative embodiment of the present invention, the case 52 of each data storage device 50 is omitted. Instead, opposite sides of the data storage device 50 are provided with a plurality of threaded holes. Each pin 54 has a threaded end engaged in a corresponding threaded hole of the data storage device 50.

Figure 7:
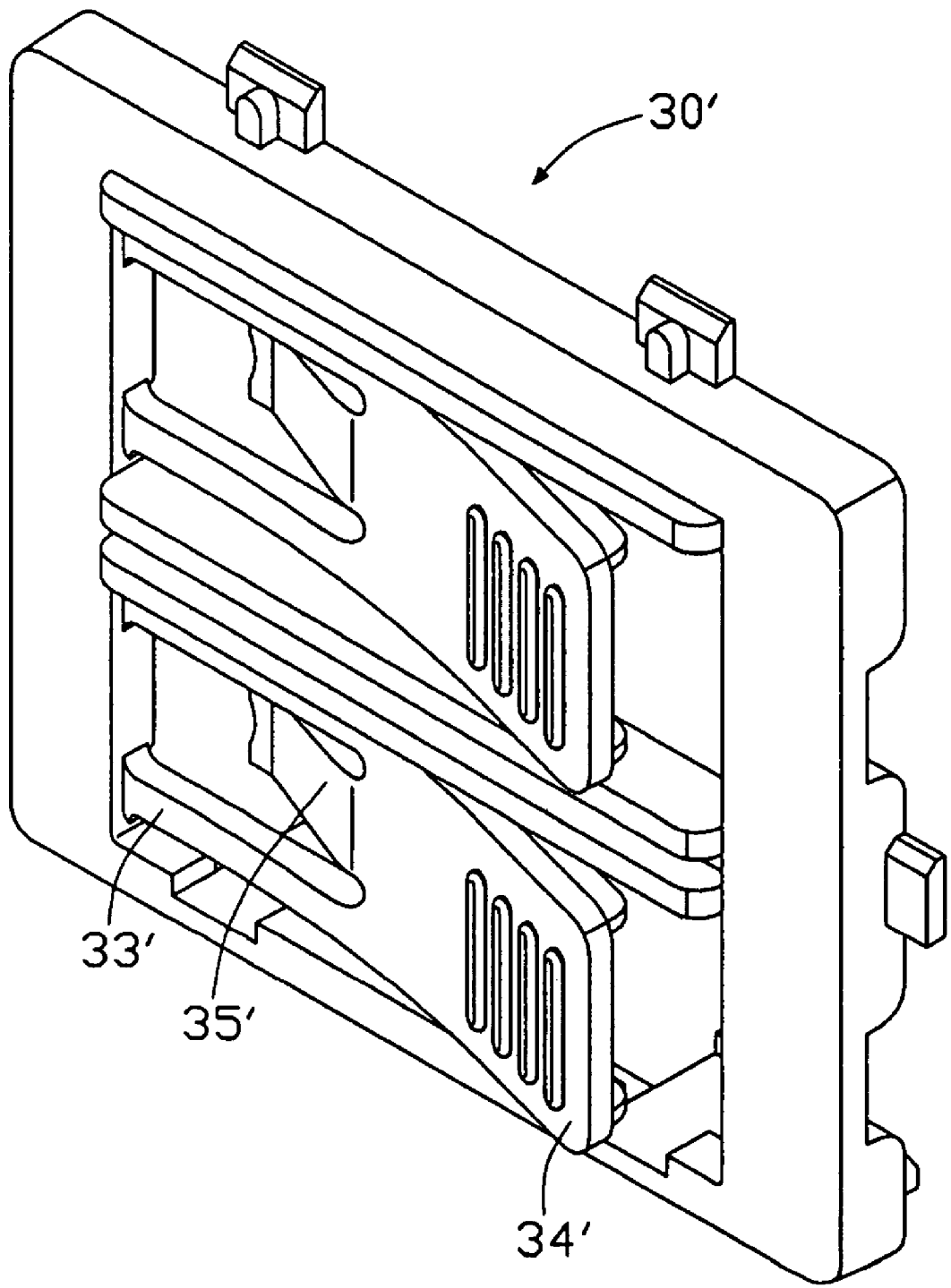
FIG. 7 is an isometric view of a locking device of a drive bracket in accordance with an alternative embodiment of the present invention.

FIG. 7 shows a further alternative embodiment of the present invention. Compared with the preferred embodiment, there are no supporting portions interconnecting distal ends of connecting arms 33' with a main body of a locking device 30'. Instead, the connecting arms 33' each have an arcuate configuration, whereby the connecting arms 33' bend slightly away from the main body of the locking device 30'. The junctions of the connecting arms 33' and the handle 34' cooperate to provide a pivot axis. The handle 34' is pivotable about said pivot axis, and the fastening portion 35' is thus drivably pivotable about said pivot axis.

According to the number of the data storage devices 50 desired, a height of the drive bracket 10, the number of slots 16, and the number of openings 31 of the locking device 30 can all be configured accordingly.

It is understood that the invention may be embodied in other forms without departing from the spirit thereof. Thus, the present examples and embodiments are to be considered in all respects as illustrative and not restrictive, and the invention is not to be limited to the details given herein.

What is claimed is:

1. A bracket for accommodating a data storage device, comprising:
   a bottom plate, and first and second side plates extending from the bottom plate, a slot defined in the first side plate, a plurality of first locking means formed at the first side plate; and
   a locking device attached to the first side plate and adapted to secure the data storage device into the bracket, the locking device comprising a plurality of second locking means to engage with the first locking means, an opening defined in the locking device corresponding to the slot, a pivotable portion formed in the opening which comprises a handle extending out of the locking device and a fastening portion extending in the slot, the handle and the fastening portion being rotated in complementary directions, the fastening portion engageable with the data storage device;
   wherein when the handle is pushed inwardly, the fastening portion moves outwardly and is releaseable from the data storage device.

2. The bracket as described in claim 1, wherein the first locking means comprises a positioning portion at an upper portion of the first side plate, and a locking hole at one of a lower portion of the first side plate and the bottom plate, and the second locking means comprises a positioning tab at an upper side of the locking device, and a hook at a lower side of the locking device.

3. The bracket as described in claim 2, wherein the first locking means further comprises a pair of retaining portions, and the second locking means further comprises a pair of retaining tabs at opposite sides of the locking device for engagingly extending in the retaining portions.

4. The bracket as described in claim 1, wherein a plurality of resilient tabs extends slightly inwardly from the second side plate, the tabs adapted for pressing the data storage device.

5. The bracket as described in claim 1, wherein a reinforcing strip is formed across the slot.

6. The bracket as described in claim 1, wherein the handle and the fastening portion are substantially coplanar.

7. The bracket as described in claim 1, wherein two connecting arms extend from a rear side of the locking device in the opening, the handle extends forwardly and outwardly from distal ends of the connecting arms, and the fastening portion extends rearward and inwardly from junctions of the handle and the connecting arms.

8. The bracket as described in claim 7, wherein a pair of supporting portions interconnects the distal ends of the connecting arms with the locking device at upper and lower extremities respectively of the opening.

9. The bracket as described in claim 7, wherein the connecting arms each have an arcuate configuration.

10. The bracket as described in claim 1, wherein the handle forms a plurality of ridges thereon, for facilitating manual gripping thereof.

11. A drive bracket assembly comprising:
    a drive bracket defining a pair of slots in opposite side walls thereof;
    a data storage device accommodated in the drive bracket, the data storage device forming a plurality of pins at opposite sides thereof corresponding to the slots of the drive bracket; and
    a fixing device attached to one of the side walls of the drive bracket, the fixing device forming a pivotable portion comprising a handle extending outwardly and a fastening portion extending inwardly; wherein the pins of data storage device slide in the slots of the drive bracket, and one of the pins is locked between a distal end of the fastening portion and an end of a corresponding slot; and when the handle is pushed, the fastening portion is driven outwardly and disengaged from said one of the pins, whereby the data storage device is slideable out from the drive bracket.

12. The drive bracket assembly as described in claim 11, wherein an opening is defined in the locking device, and the handle and the fastening portion are partly disposed in the opening.

13. The drive bracket assembly as described in claim 12, wherein two connecting arms extend from a rear portion of the locking device in the opening, the handle extends forwardly and outwardly from distal ends of the connecting arms, and the fastening portion extends rearward and inwardly from the handle between junctions of the handle and the connecting arms.

14. The drive bracket assembly as described in claim 13, wherein a pair of supporting portions interconnects the distal ends of the connecting arms with the locking device at upper and lower extremities respectively of the opening.

15. The drive bracket assembly as described in claim 13, wherein the connecting arms each have date configuration.

16. The drive bracket assembly as described in claim 11, wherein the fastening portion extends in the corresponding slot, and said one of the pins rides over the fastening portion and abuts the distal end thereof.

17. The drive bracket assembly as described in claim 11, wherein a plurality of resilient tabs extends slightly inwardly from the other side plate of the drive bracket, the tabs pressing the data storage device.

18. A drive bracket assembly comprising:

a drive bracket defining at least one slot in one of two opposite side walls thereof;

a data storage device accommodated in the drive bracket, the data storage device forming at least one pin on one of two opposite sides thereof corresponding to the slots of the drive bracket; and a fixing device attached to said one of the side walls of the drive bracket, the fixing device forming a deformable portion comprising a handle extending outwardly and a fastening portion extending inwardly; wherein the pin of data storage device slides in the slot of the drive bracket, and is blocked by the fastening portion from backwardly moving; and when the handle is pushed, the fastening portion is driven outwardly and disengaged from said one of the pin, whereby the data storage device is slideable out from the drive bracket.

19. The drive bracket assembly as described in claim 18, wherein said pin is blocked by an innermost end of the slot from forwardly moving.

20. The drive bracket assembly as described in claim 19, wherein said fastening portion and said innermost end of the slot are configured to comply with a contour of said pin.

* * * * *